May 23, 1961 F. H. SMYTHE 2,985,705
BATTERY CLIP
Filed Oct. 23, 1957 3 Sheets-Sheet 1

INVENTOR
FREDERIC H. SMYTHE
BY *m.v. Gould*
ATTORNEY

*INVENTOR*
FREDERIC H. SMYTHE

BY *mr Gould*
ATTORNEY

May 23, 1961 F. H. SMYTHE 2,985,705
BATTERY CLIP
Filed Oct. 23, 1957 3 Sheets-Sheet 3
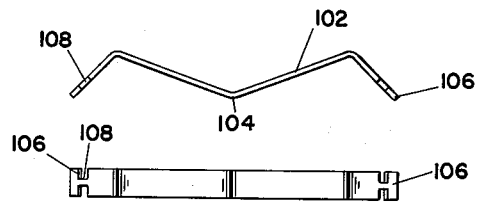
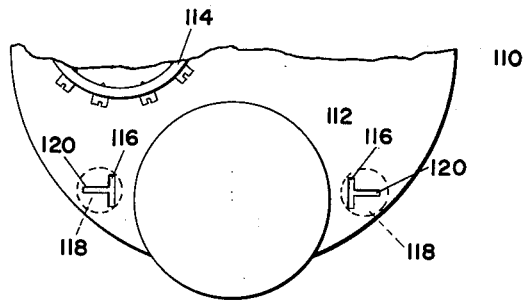
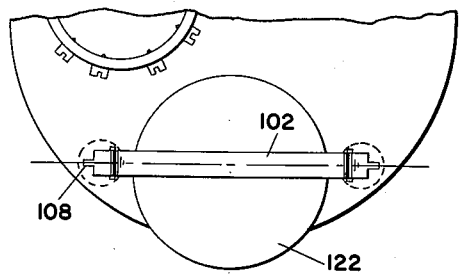
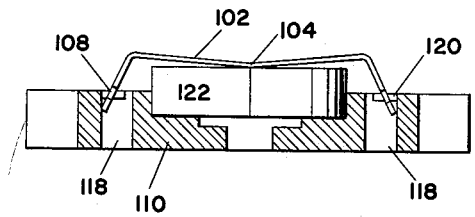
INVENTOR
FREDERIC H. SMYTHE
BY
ATTORNEY

United States Patent Office 2,985,705
Patented May 23, 1961

2,985,705

BATTERY CLIP

Frederic H. Smythe, Millersville, Pa., assignor to Hamilton Watch Company, Lancaster, Pa., a corporation of Pennsylvania Filed Oct. 23, 1957, Ser. No. 691,880

8 Claims. (Cl. 136—173)

This invention relates to battery driven watches and more particularly to that part of the construction for retaining the battery in the watch.

This case is a companion case to assignee's copending application Serial No. 656,684, filed May 2, 1957, and embodies improvements over the particular type of battery holding means shown therein.

While the clip forming the subject matter of the co-pending application is satisfactory in operation there are features in the construction which render it more economical to manufacture the type of clip disclosed in the present invention.

The subject matter of the present invention is similar to the clip shown in the co-pending application in that it is designed to provide an area for unlatching the clip that is remote from the balance wheel. The changes embodied in the construction shown herein offer convenience in handling, more economical manufacture and provide practically all the advantages of the clip shown in the co-pending application.

The present invention relates to the specific improvement of a battery clip for holding the battery in the pillar plate of a watch in such a manner that the handling of the clip in the insertion and removal of the battery keeps the tweezers or tools of the watch maker as far as possible from the delicate moving parts of the watch.

It is an object of the present invention to provide a battery holding clip which may be quickly and easily inserted to hold a battery in the pillar plate of a watch by spring action without the use of tools.

Figure 10 is a side elevation of a modification of the spring clip.

Figure 11 is a top plan view of the clip shown in Figure 10.

Figure 12 is a top plan view of a portion of the pillar plate showing the battery well and the T-shaped slots.

Figure 13 is a view similar to Figure 11 with the clip in position.

Figure 14 is a section on line 14—14 of Figure 13.

Figure 1:
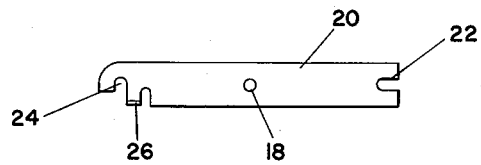
Figure 1 is a top plan view of the clip forming the subject of the invention.
Figure 2:
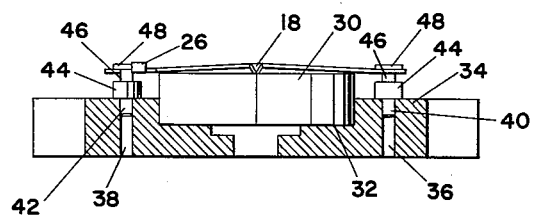
Figure 2 is a cross-section through the pillar plate showing the clip and battery in elevation.
Figure 3:
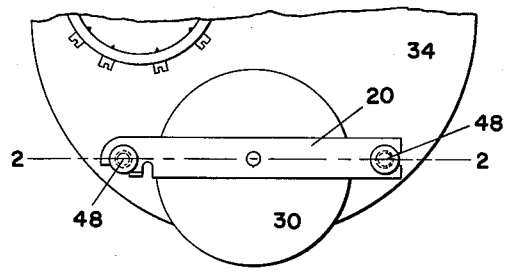
Figure 3 is a top plan view of a portion of the pillar plate with the clip.
Figure 4:
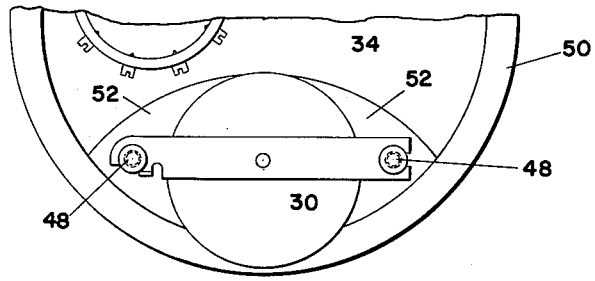
Figure 4 is a view similar to Figure 3 showing the battery set in the movement ring.
Figure 15:
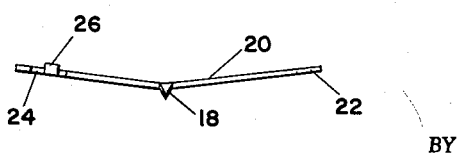
Figure 15 is a side elevation of the clip shown in Figure 1.

Referring particularly to Figures 1, 2, 3, 4 and 15 a clip formed of spring material is shown in a V-shaped formation such as in Figure 15 with a contact button 18 formed at its center. The strip metal is resilient and has a tendency at all times to return to the shape shown in Figure 15. One end of the strip 20 is formed with a notch 22 while the other end is formed with a notch 24. These notches are at right angles to each other, the notch 22 being longitudinal of the strip while the notch 24 is normal to the strip. Adjacent to the notch 24, the strip is formed with an up-turned tab 26 which serves as a lock for holding the strip against angular motion when once the strip is in position.

A battery 30 is received in a well 32 in the pillar plate 34. On a line substantially diametric with the well 32 the pillar plate is formed with holes 36 and 38, which holes are beyond the circumference of the well. Posts 40 and 42 are adapted to snugly fit within the holes 36 and 38 respectively. The posts 40 and 42 have a central collar 44 adapted to seat firmly against the surface of the pillar plate 34 and are formed with a reduced portion 46 and a cap portion 48. The upstanding portion of the tab 26 is slightly smaller than the distance between the shoulder 44 and the cap 48 so that the spring clip 20 may be securely locked in position.

The spring clip 20 is applied by slipping the notch 22 into the narrow neck portion of one of the pins and swinging the notch 24 into the reduced neck portion of the other pin by depressing one end of the clip so that the tab 26 passes between the shoulder and the cap portion. The inherent resiliency of the clip 20 holds the contact 18 in contact with the battery 30 and holds the tab to engage the cap 48 and prevent angular movement of the clip 20. To remove the battery it is only necessary to depress the tab portion of the clip, rotate the clip about the post 36 and remove the battery 30. There is a slight modification shown in Figure 4 in which a movement ring 50 is used to secure the battery 30 in position. The movement ring which is ordinarily constructed for securing the movement in the case of a watch is formed with a pair of gears 52 which overlie the pillar plate 34 and form a supporting well for the battery 30. The ears 52 have holes slightly larger than the pins 40 and 42 so that they may be inserted directly into the pillar plate which is located below the ears.

Figure 5:
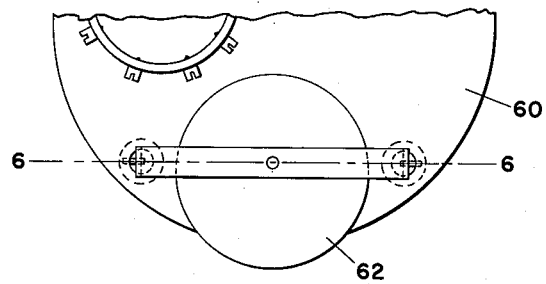
Figure 5 is a view of a second modification showing the top view of a battery and a holding clip.
Figure 6:
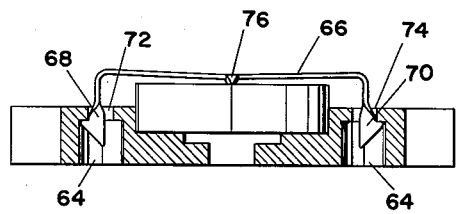
Figure 6 is a section on line 6—6 of Figure 5.

A modification is shown in Figures 5 and 6 in which a pillar plate 60 has a substantially circular recess to receive a battery 62. On a diametric line extended and passing substantially through the center of the battery a pair of wells 64 are formed in the pillar plate and on opposite sides of the recess. The ends of a clip 66 are formed with catches 68 and 70 which enter two holes 72 and 74 respectively to engage the underside of the wells 64. Here again the inherent resiliency of the spring clip 66 presses the contact button 76 into firm engagement with the battery.

Figure 7:
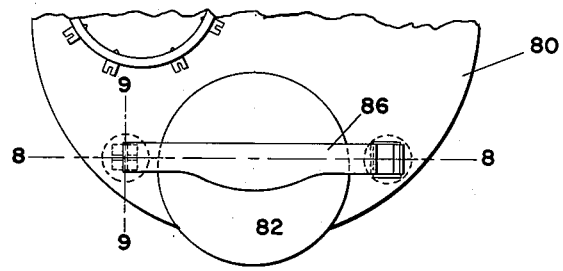
Figure 7 is a still further modification showing a top plan view of the clip and battery.
Figure 8:
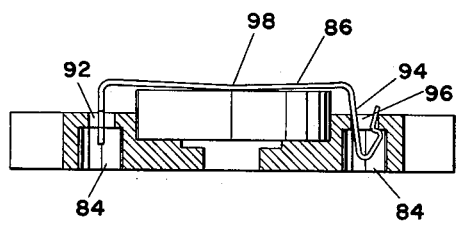
Figure 8 is a cross-section on line 8—8 of Figure 7.
Figure 9:
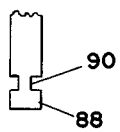
Figure 9 is a cross-section on line 9—9 of Figure 7.

In Figures 7, 8 and 9 a similar pillar plate 80 is formed with a recess for receiving a battery 82 and circular wells 84 are formed in a manner similar to that of the modification shown in Figures 5 and 6. One end of a clip 86 is formed with a cross-bar 88 and a narrow neck portion 90. The cross-bar is at right angles to the narrow neck portion and adapted to pass through the slot 92 formed in the pillar plate and opposite to the well 84. The end of the clip having the cross bar is inserted in the slot 92 and given a half turn and the other end which is bent in the form of a catch 94 is inserted through the hole 96 and engages the underside of the well 84 to securely hold the contact button 98 in engagement with the battery 82.

A further modification is shown in Figures 10 to 14 of a spring clip bent substantially in the form of an open M. Inward V-shaped portion is designed to press upon the battery and make contact in place of the contact button in the other clips, the inherent resiliency of the spring maintaining sufficient pressure to hold the battery in position. In Figures 10 and 11, a spring clip 102 is shown having a central V portion 104, the clip being substantially in the form of an open M with the outside legs terminating with a bar section 106 connected to the main portion of the clip by a narrow neck 108. In Figure 12 a pillar plate 110 is formed with a battery well 112 adjacent to the balance wheel 114. Substantially diametrically opposite the battery well are a pair of T shaped slots 116 extending from the surface of the pillar plate into a well 118. The slot 120 of the T-shaped slot is of sufficient width to admit the narrow neck 108 of the clip. Referring to Figure 13, the clip is shown in position with the central V-shaped portion substantially on the battery 122 to secure the battery in the well and at the same time make electrical contact to ground the battery to the pillar plate.

The battery clip of the present invention has all of the good qualities of the one in assignee's copending application Serial No. 656,684 together with a slightly simplified form which may be manufactured more economically. In use it is found that the diametric line directly across the battery gives slightly more security and is a little easier to insert and remove. The improvement amounts to specific detail in the construction of the clip and the formation of the pillar plate.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed and desired to be secured by United States Letters Patent is:

1. In an electric watch, a pillar plate, a battery mounted on said pillar plate, an elongated spring clip overlying and engaging the upper surface of said battery, a pair of spaced posts on said pillar plate, said clip having slotted ends for releasably engaging reduced diameter portions of said posts, and means on said clip resiliently engaging one of said posts for locking said clip against lateral movement.

2. Apparatus as defined in claim 1 in which one of said slots opens laterally of said clip and said locking means comprises a vertical tab constructed to pass through the recess defined by said reduced diameter portion of one of said posts and engage the top of said one post by the return force of said spring clip.

3. Apparatus as defined in claim 2 wherein the other of said slots opens longitudinally of said clip and said laterally opening slot is positioned with respect to said longitudinally opening slot so as to resiliently urge the end of said longitudinally opening slot into abutting engagement with the reduced diameter portion of the other post.

4. In an electric watch, a pillar plate, a battery mounted on said pillar plate, an elongated spring clip overlying and engaging the upper surface of said battery, said pillar plate having a pair of spaced holes therein located on diametrically opposite sides of said battery, said holes including means for releasably engaging the ends of said spring clip, said clip resiliently holding said battery in position against said pillar plate.

5. Apparatus as defined in claim 4 in which said holes are provided with an enlarged lower portion and the ends of said clip include means for releasably engaging the flange defined by the top surface of said enlarged portion.

6. In an electric watch comprising a pillar plate, a battery mounted on said pillar plate, an elongated spring clip overlying and engaging the upper surface of said battery, first and second retaining means, said second retaining means being a post, one end of said spring clip being pivotally mounted by means of said first retaining means, the other end of said spring clip being slotted for releasably engaging said post, and means on said clip resiliently engaging said post for locking said clip against said post.

7. In an electric watch as defined in claim 6 wherein said post has an enlarged portion and said locking means comprises a vertical tab adapted to pass by said enlarged portion to permit said slotted end of said spring clip to engage said post, the resiliency of said spring clip being effective to urge said tab into engagement with said enlarged portion when said spring clip is in engagement with said post, whereby said spring clip will be locked against said post.

8. In an electric watch as defined in claim 7 wherein the slot at said other end of said spring clip extends laterally of the longitudinal axis of said clip.

References Cited in the file of this patent

UNITED STATES PATENTS

| | | |
|---|---|---|
| 796,517 | Jackson | Aug. 8, 1905 |
| 983,760 | Patterson | Feb. 7, 1911 |
| 1,949,088 | Strohacher | Feb. 27, 1934 |
| 2,025,482 | Taylor | Dec. 24, 1935 |
| 2,067,352 | Smith | Jan. 12, 1937 |
| 2,665,542 | Sheldon | Jan. 12, 1954 |
| 2,692,944 | Mendelson | Oct. 26, 1954 |
| 2,697,300 | Lohr et al. | Dec. 21, 1954 |
| 2,865,163 | Ensign et al. | Dec. 23, 1958 |